United States Patent [19]

Brown

[11] 4,409,010
[45] Oct. 11, 1983

[54] METHOD AND APPARATUS FOR GLASS MOULD LUBRICATION

[75] Inventor: Roy Brown, Dronfield, England

[73] Assignee: Graphoidal Developments Limited, England

[21] Appl. No.: 277,898

[22] Filed: Jun. 26, 1981

[30] Foreign Application Priority Data

Jun. 26, 1980 [GB] United Kingdom ............... 8020909
Apr. 23, 1981 [GB] United Kingdom ............... 8112593

[51] Int. Cl.³ .......................................... C03B 39/00
[52] U.S. Cl. ........................................ 65/26; 65/170; 65/262
[58] Field of Search ....................... 65/26, 170, 262

[56] References Cited

U.S. PATENT DOCUMENTS

| | | | |
|---|---|---|---|
| 2,410,422 | 11/1946 | Breene et al. | |
| 3,141,752 | 7/1964 | Keller | 65/25 |
| 3,480,422 | 11/1969 | Lichok et al. | 65/169 |
| 3,523,016 | 8/1970 | Mattos | 65/26 X |
| 3,580,711 | 5/1971 | Hamilton | 65/26 X |
| 3,623,856 | 11/1971 | Keller | 65/169 |
| 3,721,542 | 3/1973 | Keller | 65/170 X |
| 3,814,594 | 6/1974 | Mumford | 65/169 |
| 3,988,137 | 10/1976 | Goodwin | 65/24 |

FOREIGN PATENT DOCUMENTS 1371728 10/1974 United Kingdom .
1382869 2/1975 United Kingdom .

OTHER PUBLICATIONS

"Fully Automatic Swabbing of Blanks & Neck Rings on IS Machines" Graphical Developments LTD, Lubrication Engineers, Sheffield, England, GL 819, Brochure Data Unknown.

Primary Examiner—Robert L. Lindsay, Jr.
Attorney, Agent, or Firm—Burns, Doane, Swecker & Mathis

[57] ABSTRACT

Apparatus for spraying lubricant onto the blank moulds of an IS glass forming machine has static spray heads above the open positions of the mould halves, to spray downwardly onto them when the mould halves are open. Electrical and pneumatic equipment in a separate cabinet causes metered quantities of lubricant to be delivered after a predetermined number of machine cycles. The neck rings may also be sprayed by a further static spray head which is positioned above the mould halves and sprays through the space between them when they are open.

9 Claims, 22 Drawing Figures

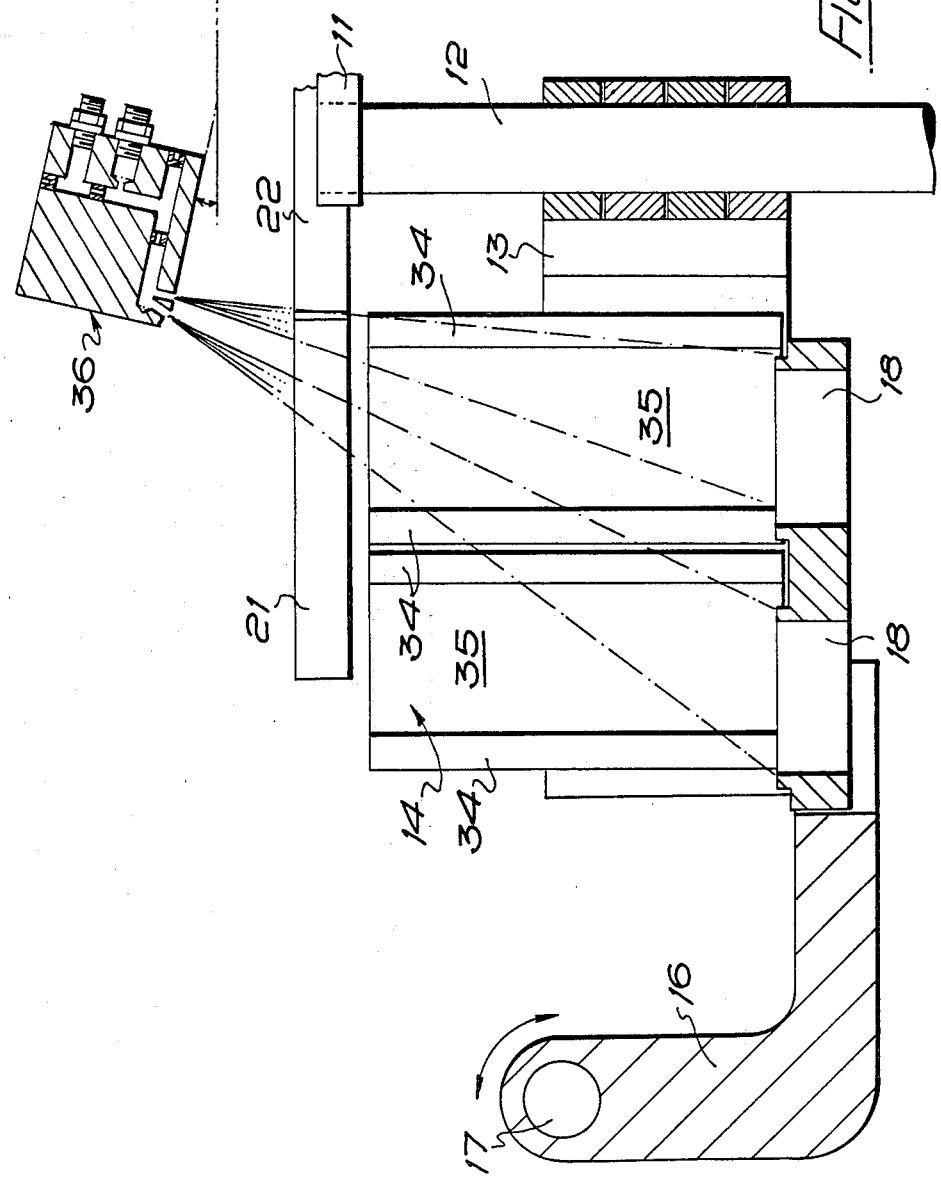

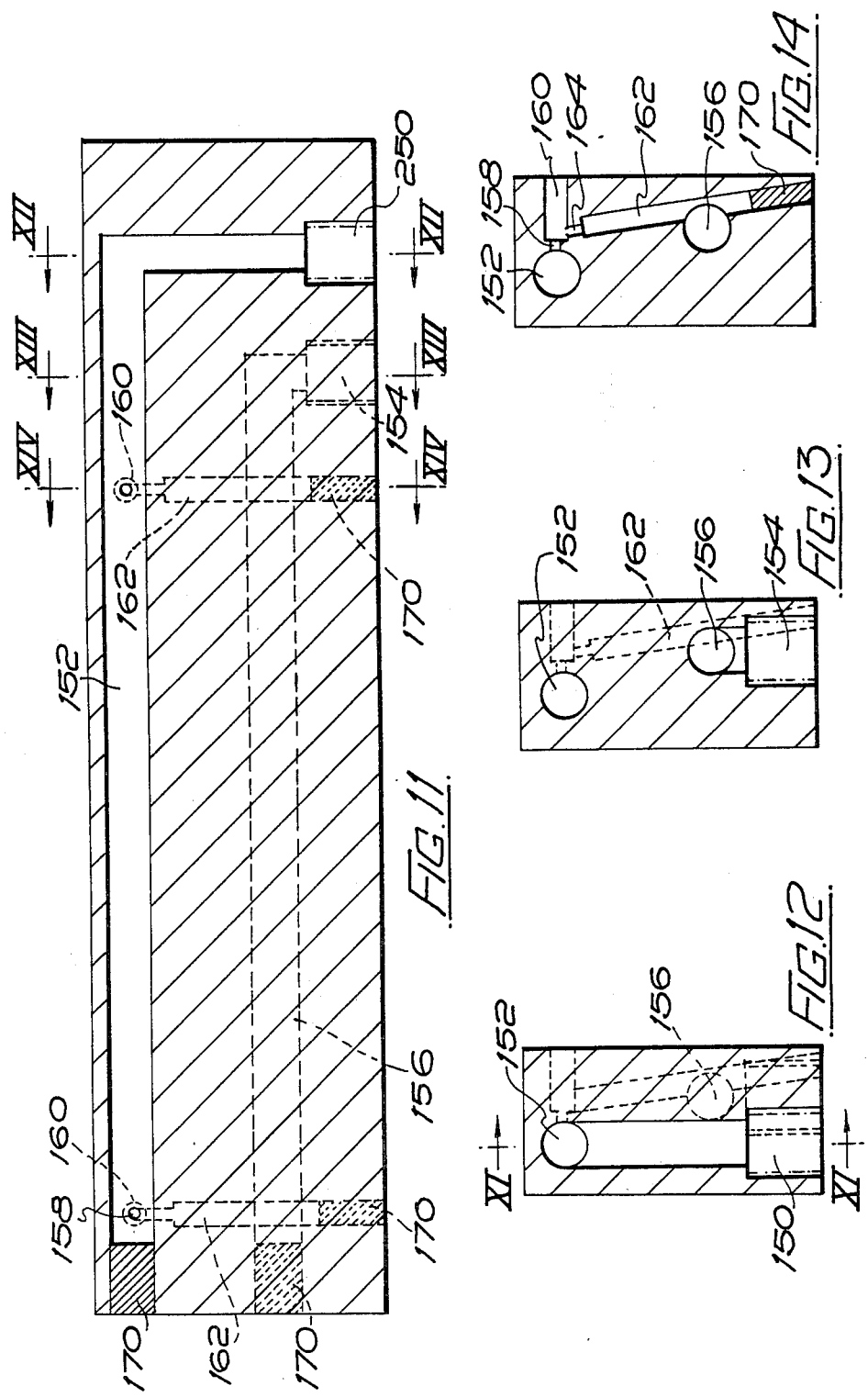

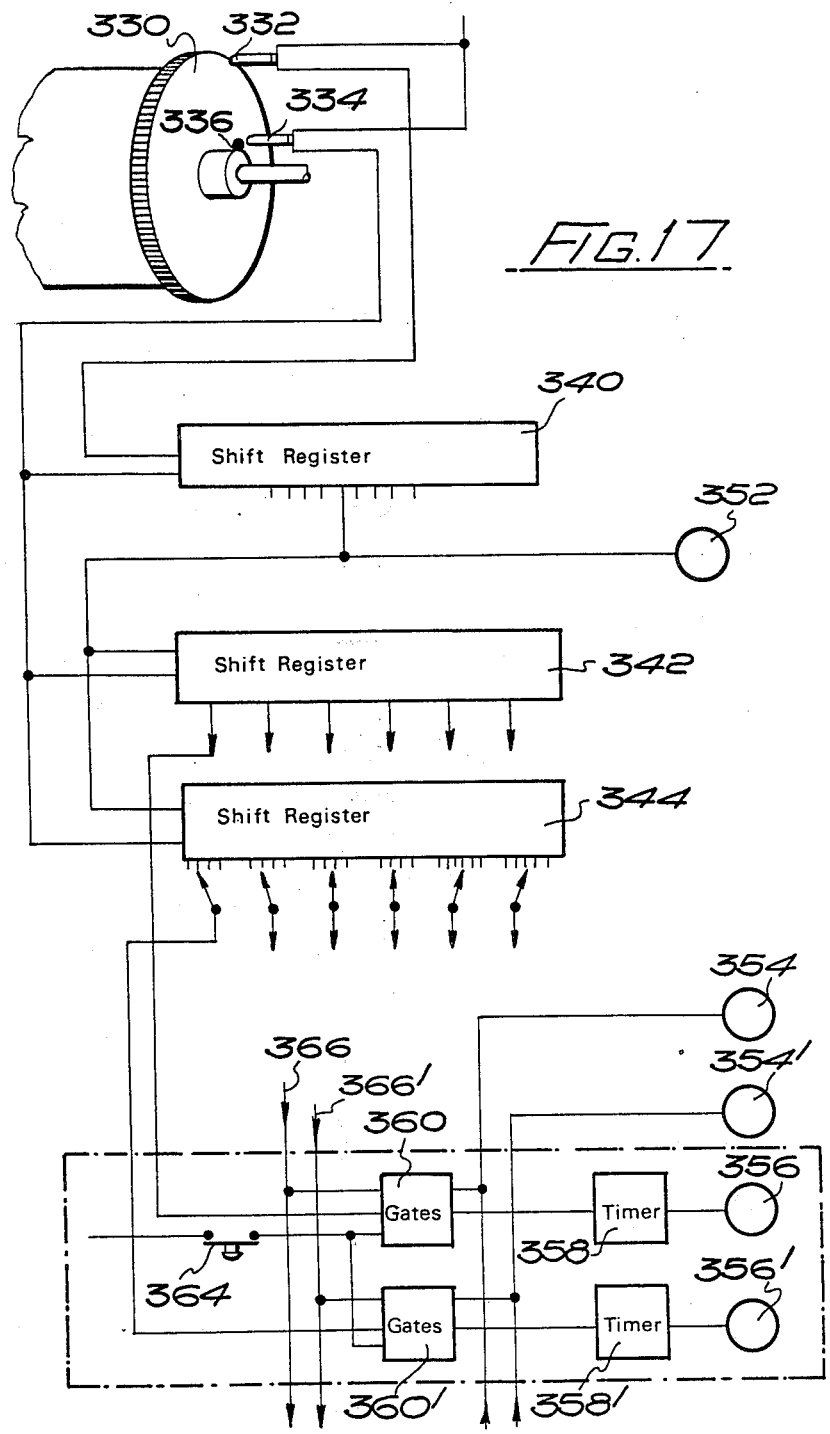

4,409,010

METHOD AND APPARATUS FOR GLASS MOULD LUBRICATION

BACKGROUND OF THE INVENTION

1. Field of the Invention

This invention relates to the application of lubricant to the moulds—in particular the blank moulds—of a hollow glassware forming machine while the machine is operating. (Although certain features embraced within this invention, but inventive in their own rights, could be used in lubrication of other moulds).

Glass bottles and jars are made by a blow moulding process. A gob of molten glass is introduced into a so-called blank mould and formed to a desired hollow shape by pushing a solid core into the glass or applying an air jet to achieve the same result. The hollow parison formed in this way is then transferred from the blank mould to a finish or blow mould in which it is blown out to the shape of the finished bottle or jar.

The most commonly used machine for this purpose is a so-called Independent Section (IS) machine having six, eight or ten sections each of which has a blank mould and a blow mould. The machine takes its name from the fact that any section can be stopped while the others continue to run. This facility is employed when blank moulds are changed. The moulds of each section may have one, two or three cavities each of which will be charged with glass simultaneously and the machines are accordingly classified as single gob, double gob or triple gob IS machines.

The moulds of glass forming machines require lubrication at regular intervals. In the case of blank moulds this is typically in the order of every 15 minutes or so. Customarily the lubricant consists of a suspension of graphite in a liquid carrier which consists predominantly of oil. The application of the lubricant to the moulds has for many years been done by hand, using a small mop; and is termed swabbing.

This is so despite the risk to which the machine operator is exposed; moreover hand swabbing makes the extent of lubrication inherently unrepeatable, because it is dependent on the individual operator.

2. Summary of the Prior Art

It has been appreciated for years that it would be desirable to have mechanical, and preferably automatic, equipment for the application of lubricant to moulds of glass forming machines.

There have been a number of proposals for solving the problem. Most of these have entailed applying lubricant by spraying. Many have suggested spraying the lubricant into the mould cavities while the moulds are closed, an approach which does avoid accumulating lubricant on the mating faces of the moulds so that they cannot close properly. Examples of this approach are U.S. Pat. Nos. 3,141,752; 3,480,422; 3,623,856; 3,721,542; and 3,814,594; and UK Pat. No. 1,371,728.

U.S. Pat. No. 3,523,016 proposes applying a spray of lubricant to the open blank mould halves. The spray is discharged from nozzles mounted on the neck ring arm (this carries rings which mould the necks of containers, and convey the formed parisons to the blow mould). The spray is discharged as the arm passes between the open mould halves. An airless spray is employed.

U.S. Pat. No. 3,141,752, (which is directed to apparatus which sprays while the mould is closed) mentions earlier attempts using fixed sprays which discharged while the moulds were open. It is stated, however, that this required the glass forming machine to be slowed down, and did not reliably give a uniform application of lubricant. Those proposals are also mentioned in U.S. Pat. Nos. 3,623,856 and 3,814,595.

The prior proposals have displayed various disadvantages. Some entail substantial modification to an IS machine. Some cause a loss of ware, i.e. the next glassware moulded is spoilt (which also happens with hand swabbing). Loss of ware can even continue for two or three moulding cycles.

It has been reported that apparatus has run satisfactorily for three months or so, but has then required an excessive amount of work to keep it running thereafter.

However, for whatever reasons, no automatic swabbing equipment has gained commercial acceptance and hand swabbing remains widespread.

SUMMARY OF THE INVENTION

The object of the present invention is to provide effective automatic spraying of moulds on a glass forming machine.

It is another object of this invention to provide apparatus for this purpose which need not entail substantial modification of the glass forming machine.

In this invention spray discharge points are arranged so as to be above or below the open positions of the mould halves and a quantity of lubricant is discharged from the said points onto the mould halves while in their open position.

The provision of automatic swabbing equipment for the blank moulds of an IS machine, without substantial modification to the machine, is difficult because there are parts whose paths of movement run close to the moulds and these leave very little space. Notably the funnels and baffles run not far above the blank moulds. The inventor has appreciated, however, that compact spray heads can be accomodated in fixed positions generally on the axes of the mould halves when open, yet beyond their axial extent. Preferably the spray heads are mounted above the moulds, and below the paths of funnels and baffles, to spray downwards. Alternatively, they could be put below, to spray upwards. Placing the spray heads above the moulds has the benefit that the spray heads are accessible.

Preferably, each spray discharge point is arranged to lie directly over the half-cavity bounded by a mould half, so that spray which goes onto the half-cavity's surface does not cross the plane of the abutment face of the mould. Spray which does cross this plane does not go onto the surface of the abutment face to any substantial extent.

It is preferred that air and lubricant are delivered separately to the spray heads. Also, it is highly desirable that lubricant should not drip from the spray discharge points after the spraying has stopped, because drips leave sticky deposits on the machine and if they fall on a mould cause loss of ware (because of gross overlubrication of a small area). To prevent lubricant contained in the delivery ducts from dripping out when not desired, it is a preferred feature of the invention that delivery of lubricant to the point at which it is mixed with air extends along an upwardly ascending and/or constricted run just upstream of each mixing point, from which mixed air and lubricant travel towards the mould parts. Mixing may be effected at the aforementioned spray discharge points, in which case there will be direct downward discharge immediately upon mixing. However, there may be a certain amount of lateral flow of mixed air and lubricant to the aforementioned spray discharge points, followed by downward discharge therefrom.

It may be advantageous to arrange that the delivery of air to each mixing point commences somewhat before the delivery of lubricant so that the latter is discharged into an established air stream. Also it may be advantageous for the delivery of air to continue for a short time after the delivery of lubricant, so as to blow out any lubricant collected on the walls of the mixing zone and/or mixture flow path, and which might otherwise subsequently drip.

In another aspect the invention provides a spray head for the intermittent application of lubricant spray to mould parts, having inlet means for the admission of air and lubricant, one or more downwardly opening chambers or ducts for the discharge of a mixture of air and lubricant therefrom and passage means leading from the inlet means to the or each such chamber or duct with a respective passage section for conveying lubricant, and which is proximate the or each such chamber, rising towards the entrance for lubricant to that chamber. Preferably there are separate inlets to the head for air and lubricant, and separate said passages for air and lubricant leading from those inlets to the or each such chamber or duct so that the mixing of air and lubricant takes place in the chamber(s) or duct(s) from which the mixture is then downwardly discharged. A said duct may convey mixed air and lubricant laterally, prior to downward discharge.

In a preferred form of construction, a spray head for mould halves of a double or triple gob machine consists of two halves having mating faces which are in sealing contact—this can be achieved by means of a interposed gasket, for example—and the channels for air and lubricant are provided by means of grooves milled in at least one of the mating faces.

In a further aspect, this invention provides a method of lubricating the neck rings of a glass forming machine wherein one or more discharge points is arranged above the level of blank mould halves and a spray of lubricant is discharged from the said points intermittently, the discharge being synchronised with the machine to take place while the blank mould halves are open, and directed past these mould halves through the space between them onto the neck ring. It may be desirable for the spray to be commenced slightly before the neck ring has reached its lowermost position, in order to complete the spraying before the mould closes.

The features of the separate delivery of air and lubricant to the spray head, and a rise in the path for lubricant delivery proximate to each mixing point, are preferably employed both in spray heads for neck rings and spray heads for mould halves.

The spray heads for the neck rings could be supplied and controlled by the same equipment as is used to supply and control the heads which spray the mould halves. However, it is preferred to supply and control them largely independently. The intervals at which the neck rings are sprayed may be the same as, or different from, the intervals at which the mould halves are sprayed.

BRIEF DESCRIPTION OF THE DRAWINGS

FIG. 3 is a section on line III—III of FIG. 2;

FIG. 11 is a sectional view of a third spray bar;

FIGS. 12, 13 and 14 are sections on lines XII—XII, XIII—XIII and XIV—XIV of FIG. 11;

FIGS. 17 and 18 show schematically an alternative electric circuit.

DESCRIPTION OF PREFERRED EMBODIMENTS

The apparatus consists of parts which are fitted onto each section of an IS machine, and a control and supply unit which can stand beside the machine, or at a little distance from it. The parts fitted onto the machine are passive; they do not move during use and contain no moving parts. No modification of the IS machine is required, apart from drilling some bolt holes. The apparatus can thus be regarded as a "bolt on accessory".

Parts fitted to the IS machine

Figure 1:
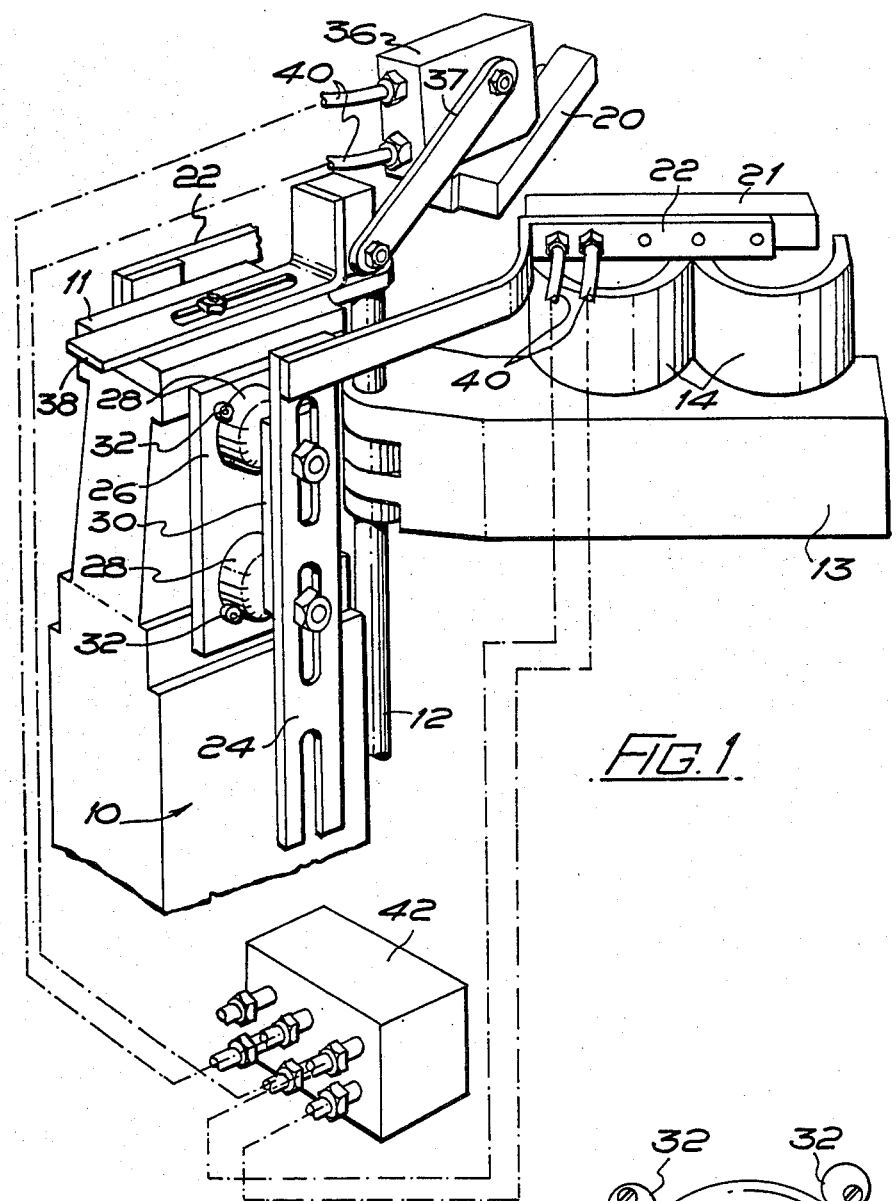
FIG. 1 is a perspective view of part of one section of a double gob IS machine, and of spraying equipment fitted thereto.
Figure 1A:
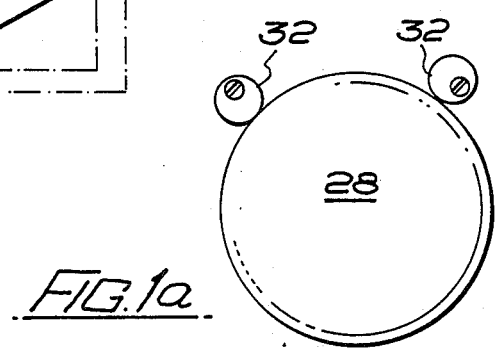
FIG. 1a is a detail of two collars.
Figure 2:
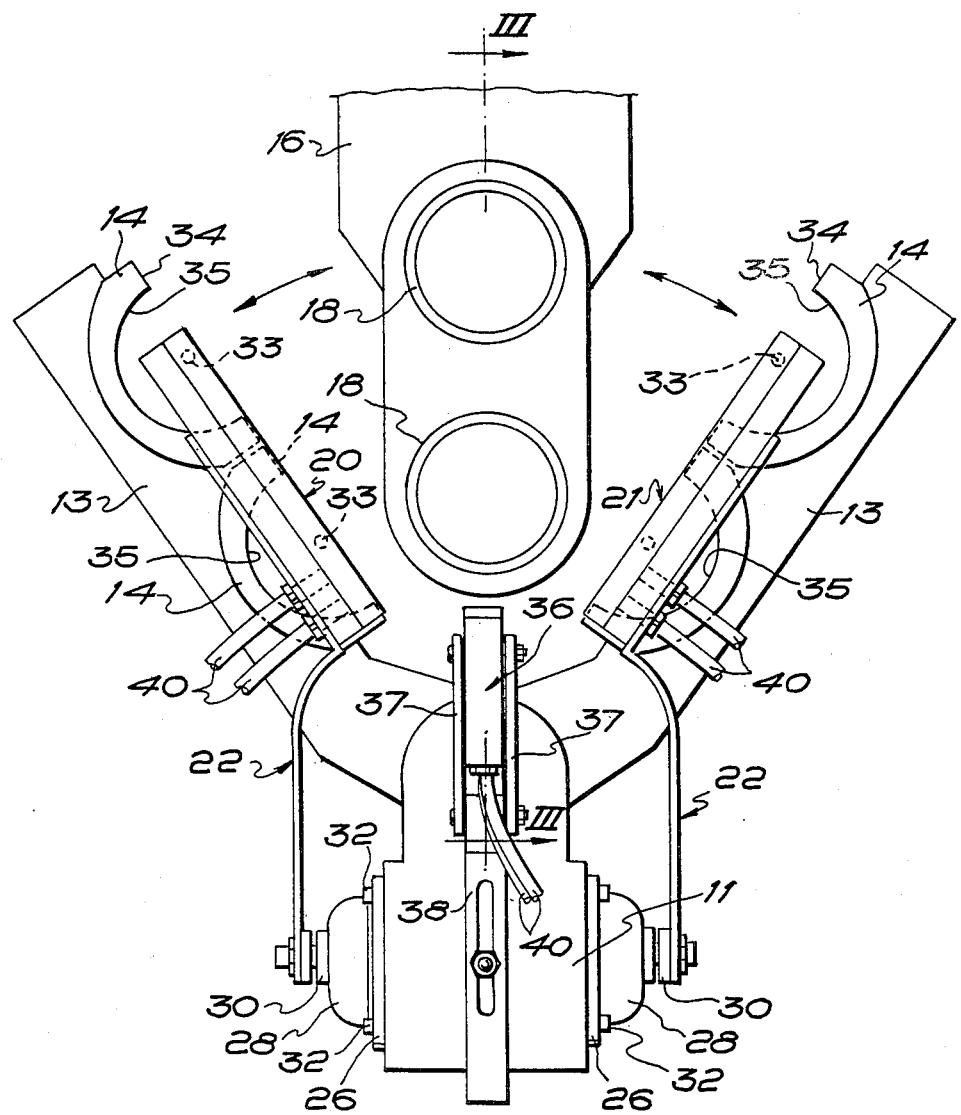
FIG. 2 is a somewhat diagrammatic top plan view of this equipment and of an open blank mould of the IS machine.

FIGS. 1 to 3 of the drawings show the parts fitted to one section of an IS machine. Analogous parts are fitted to each other section. As is conventional, the machine has an upright casting 10 carrying a cap 11 which provides a mounting for the top of an adjacent upright pillar 12. Pivotally mounted on the pillar 12 are a pair of carrier arms 13 to which the blank mould halves 14 are attached. The funnels and baffles move in the space above the mould halves 14 and clearance between the tops of the mould halves and the paths of the funnels and baffles is limited. An arm 16 carrying a pair of neck rings 18 is mounted about a horizontal axis 17 so as to be able to swing upwardly through the space between the mould halves 14, when open, to carry a pair of formed parisons over to the blow moulding side of the machine, and after blowing swing back empty. The arms 13 swing towards each other to close the mould over the top of the neck rings.

Lubricant is sprayed onto the mould halves 14 by means of a pair of spray bars 20,21 each bolted to a bracket 22 having a slotted upright arm 24. Mild steel plates 26 are permanently bolted to each side of the casting 10. Each upright arm 24 is bolted through its slot to an assembly consisting of a pair of permanent magnets 28 attached to a bar 30. The magnets 28 adhere to the mild steel plate 26 and so position the spray bars 20,21 above the open position of the blank mould halves 14 as shown in FIG. 2. On each mild steel plate 26 there are four bolts holding eccentric collars 32 which are used to define the position at which the magnets 28 adhere. This position is set when initially attaching the equipment to the IS machine and thereafter need not be varied. When it is desired to remove blank moulds, for example at a job change, each assembly of a spray bar, bracket and magnets can be pulled away from the casting 10 and adhered by its magnets in any convenient position out of the way. The whole assembly can be replaced as quickly and the collars 32 establish exactly the position at which the magnets adhere back onto the plate 26. Blank moulds for different items of glassware have varying heights and the slots in the upright arms 24 of the brackets enable the vertical position of the spray bars to be adjusted in order to keep them positioned fairly closely above the blank mould halves 14.

It will be appreciated that if the IS machine was of slightly different construction so that the plates 26 could not be bolted on at the position mentioned above, a different shape of bracket could enable the spray bars 20,21 to be connected to similar plates at some other convenient position while still employing the principle of attaching them by means of permanent magnets with a precisely defined attachment position.

As can be seen from FIG. 2, the spray bars 20,21 are positioned above the fully open positions of the two halves 14 of the blank mould. It is arranged (as will be explained hereafter) that spray discharges from the bars 20,21 while the mould halves 14 are open. Each aperture 33 from which spray discharges downwardly is disposed above a cavity region of the respective mould half 14 so that its upright axis runs between the plane of that mould half's abutment face 34 and the curved walls 35 bounding the mould cavity. With the spray bars positioned as shown the spray of lubricant goes onto the curved mould faces 35, but not in any substantial amount onto the flat abutment faces 34. It has been found that if the mould flares outwardly in the downward direction the spray will follow around the flare and adequate uniformity of lubrication is achieved.

Lubricant is sprayed onto the neck rings 18 from a spray head 36 carried between two arms 37 bolted onto a bracket 38 which in turn is bolted onto the top of the cap 11. This assembly 36-38 does not have to be moved when changing blank moulds.

The spraying of lubricant from the head 36 is arranged to take place while the neck rings 18 are in their lowermost positions between and below the blank mould halves 14. The spray travels past the mould halves 14 onto the neck rings 18, as shown by FIG. 3.

The two spray bars 20,21 and the spray head 36 for the neck rings all have separate inlets for compressed air and for lubricant. These inlets are connected by means of stainless steel braided flexible hoses 40 to a distribution block 42 for that section of the IS machine. Each section of the IS machine has a separate block, and each block is connected by separate pipes to the control and supply unit.

Each distribution block 42 has a pair of inlets for compressed air and lubricant for the spray head 36 to which it is connected. These are connected within the block to outlets to which the hoses 40 leading to the head 36 are attached. The distribution block has a further pair of inlets for air and lubricant for the spray bars 20,21. Each of these is connected to a pair of outlets, one for each of the spray bars. Thus the distribution block has four inlets and six outlets altogether. These inlets are all connected to the control and supply unit by separate pipes so that an eight section IS machine would require thirty two pipes in all between this unit and the machine.

Spray Head Constructions

Figure 4A:
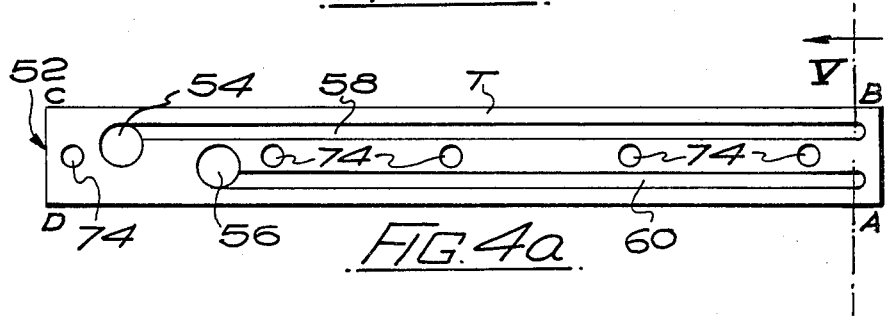
FIGS. 4a and 4b show each half of a spray bar of FIG. 1; the two halves having been opened out from one another to expose their mating faces.
Figure 4B:
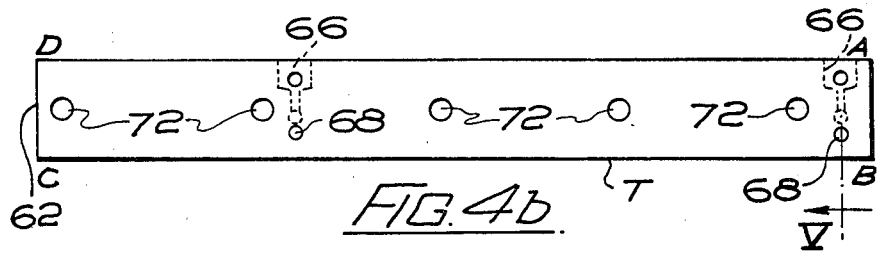
Figure 5:
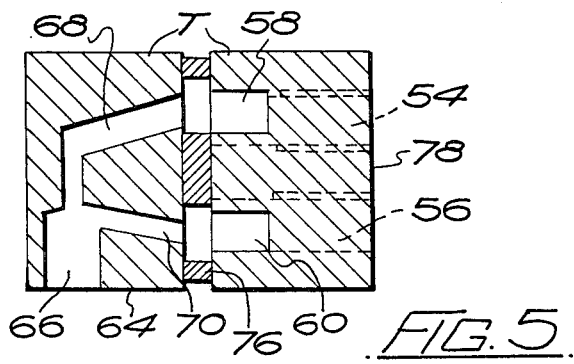
FIG. 5 is a section to a larger scale through the assembled bar on lines V—V of FIGS. 4a and 4b.

FIGS. 4a, 4b and 5 illustrate the construction of the spray bar 20 (bar 21 is a mirror image). The bar consists of two halves 52,62 and in FIG. 4 the corresponding corners of the two half bars bear the same reference letters, so that on fitting the bars together corners A join together, corners B join together and so on. Tops of the half bars are designated T.

The half bar 52, shown in FIG. 4a is a solid block in which two through holes 54,56 are drilled and two grooves 58,60 are milled. The grooves extend along the length of the half bar and communicate with respective holes 54,56.

The half bar 62, shown in FIG. 4b is drilled from its bottom face 64, to form two chambers 66. These provide the discharge openings 33. In them air and lubricant mix and discharge downwardly as a spray. Further drilled holes provide a passage 68 leading into the top of each chamber 66, and a passage 70 also leading into each chamber 66. The passage 70 runs upwardly, at an angle of 10° from the mating face of the half bar 62 to the chamber 66. It is of smaller cross section than the groove 60 which itself is not large.

The two half bars 52,62 are fastened together with a gasket 76 in between them, by means of bolts passing through counterbored holes 72 into tapped holes 74. Attachment to the bracket 22 is by bolts passing through holes in the bracket into tapped holes (not shown) in half bar 52.

The hoses 40 for air and lubricant are connected to the holes 54,56, which are tapped to receive screw connectors for the hoses. Thus air is delivered to the chambers 66 via passages 54,58,68 while lubricant is delivered via separate passages 56,60,70. The inlets to the bar are in its side face 78 and the screw connectors for the hoses 40 extend through holes in the bracket 22 which is bolted to this face.

Figure 3A:
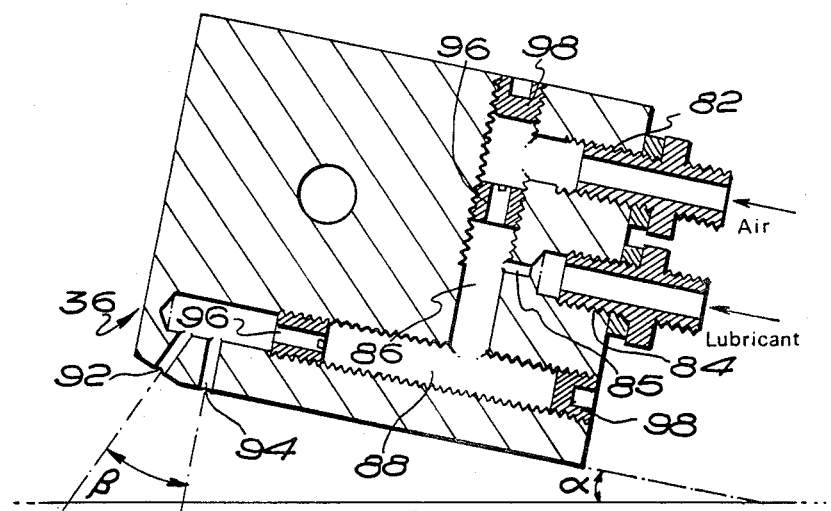
FIG. 3a is an enlargement of the section through the neck rings spray head, still on line III—III.

As shown by FIG. 3a, the spray head 36 for lubricating the neck rings consists basically of a cuboidal block drilled to provide an air inlet bore 82, a lubricant inlet bore 84, a descending duct 86 into which the air and lubricant are both supplied and a slightly ascending duct 88 leading to two downwardly extending bores 92,94 from which in use the mixture of air and lubricant is discharged. The axes of these are at an angle $\beta$ to each other. The inlets 82,84 are tapped to receive screw connectors for hoses 40.

The whole head 36 is positioned at an angle $\alpha$ to the horizontal, and in consequence the constricted passage 85, through which lubricant is delivered into the descending duct 86, rises in the direction of lubricant flow.

The ducts 86,88 are each tapped for part of their length and contain respective venturi nozzles 96 which are externally threaded so that their positions can be adjusted in their respective ducts. Access to these nozzles is gained via removable plugs 98. Adjustment of the positions of these venturi varies the nature of the spray which is delivered.

Figures 6, 7:
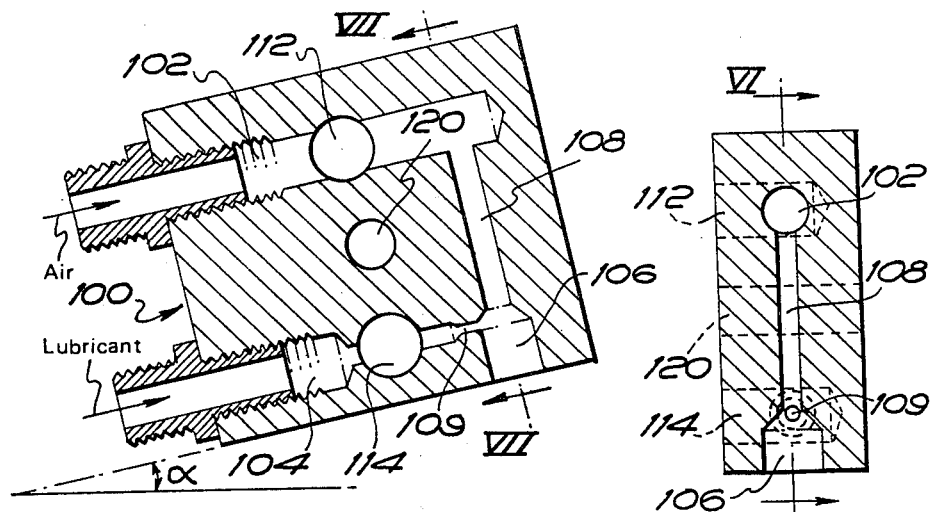
FIG. 6 is a section through a component of an alternative spray head for neck rings.
FIG. 7 is a section on line VII—VII of FIG. 6.
Figure 8:
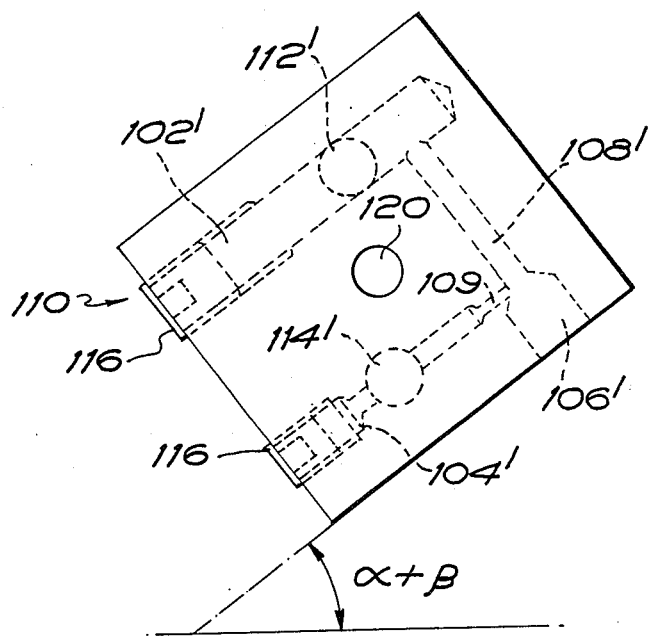
FIG. 8 is a view onto the second component of this spray head.
Figure 9:
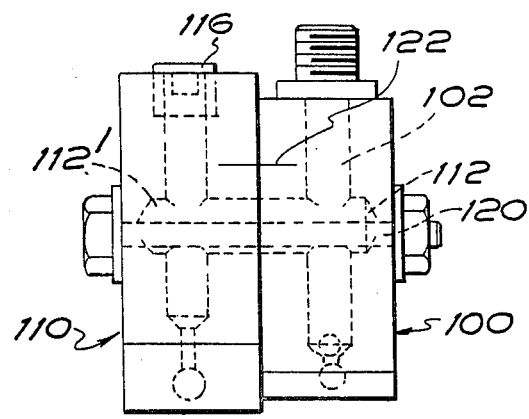
FIG. 9 is a plan view of the two components assembled side by side.

FIGS. 6 to 9 show an alternative ring spray head. This consists of two components each of which is basically a rectangular block. The component 100 shown in FIG. 6 is drilled to provide an air inlet duct 102, a lubricant inlet duct 104, a chamber 106 in which air and lubricant mix and discharge downwardly as a spray, a duct 108 by which the air inlet duct 102 is connected to the chamber 106, and a narrow duct 109 through which lubricant enters the chamber 106. The second component 110 shown in FIG. 8 is drilled similarly. The two components are assembled together face to face as shown by FIG. 9 and each component is drilled from its abutment face to provide commoning ports 112,114.

The two components are assembled together with one of them set at an angle relative to the other. The commoning ports are positioned so that when thus assembled the ports 112,114 of component 100 connect with the ports 112', 114' of the component 110. Air and lubricant are supplied to the inlets of the component 100 by flexible hoses 40 and screw connectors as previously described but the equivalent positions of component 110 are blocked by solid plugs 116. Air and lubricant delivered to component 100 not only discharge from its downwardly opening chamber 106 but also travel through the commoning ports to component 110 where they mix in, and discharge from, the downwardly open chamber 106'. Because the components are set at an angle to each other the axes of their respective spray jets are also at an angle. Both components are mounted at an angle to the horizontal so that the passages 109, 109' by which lubricant is delivered into the chambers 106,106' each ascend in the direction of flow.

The two components are secured together by a bolt through their holes 120. This bolt can also be employed to mount the two components between arms 37 attached to a mounting bracket 38 as above. A gasket (not shown) is placed between the abutment faces of the two components. The top face of each component bears a scribed line 122 and alignment of these enables the two components to be set at the correct relative angle. The ducts 108, 108' are drilled at slight angles to the vertical plane of FIGS. 6 and 8 to compensate for parallax error, and direct the sprays onto the neck rings.

Figure 10:
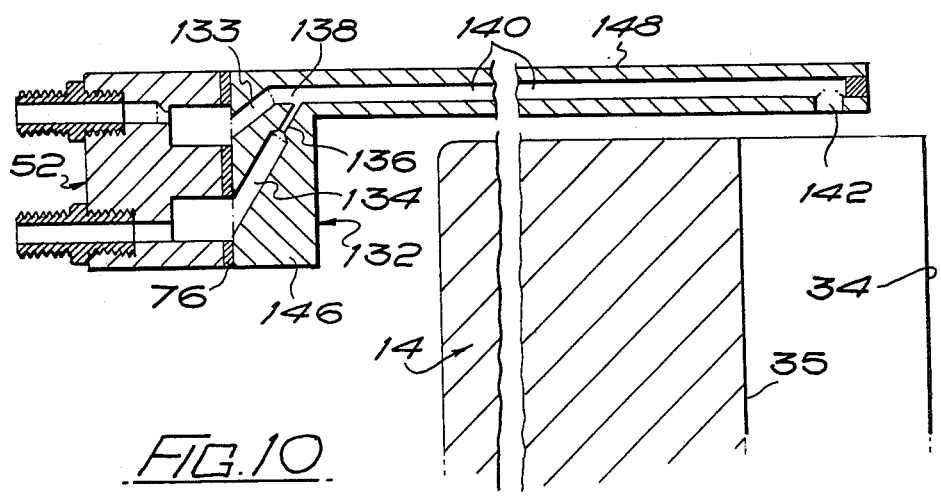
FIG. 10 is a section, analogous to FIG. 5 showing a second form of spray bar.

In some IS machines there is insufficient clearance between the tops of the blank mould halves 14 and the paths of movement of the funnels to accommodate whole spray bars over the open positions of the blank moulds in the manner described with reference to FIGS. 1 to 4. FIG. 10 shows a spray bar construction to deal with this difficulty. The spray bar employs a half bar 52 as previously described. However, this is attached to a different half bar 132. The half bar 132 is of L-shaped cross section and is drilled to provide a system of ducts at each of two points along its length corresponding to the two half cavities. At each point there is an air supply duct 133 and a lubricant supply duct 134 leading through a restricted section 136 to a mixing point 138 from which a duct 140 carries the mixture of air and lubricant to a downward discharge aperture 142. The lubricant duct 134 and the restricted section 136 which delivers to the mixing point ascend in the direction of flow.

A blank mould-half 14 in its fully opened position, at which it would be sprayed, is shown and it will be seen that the half bar 52 and the short arm 146 of the half bar 130 lie outwardly of the mould half 14 with the longer arm 148 projecting above the blank mould. This construction enables the arm 148 to be made slender and hence to fit into a particularly limited clearance between the top of the blank mould-half 14 and the paths of the funnels.

The aperture 142 is, like the apertures 33 shown in FIG. 2, positioned above a cavity region, between the flat face 34 and the curved wall bounding the cavity.

This form of spray bar would again be mounted by means of brackets attached magnetically onto the machine. It is evident, however, that a different bracket shape would be required.

FIGS. 11–14 show a further form of spray bar which would be used for the same application as the bar shown in fIGS. 4 and 5 and would be mounted over a blank mould half 14 in the same way.

Unlike the preferred bar shown in FIGS. 4 and 5, however, this bar is formed from a solid steel cuboid by appropriately drilling and plugging. An air inlet 150 leads to a duct 152 running along the bar somewhat above a lubricant inlet 154 and lubricant duct 156 which also runs along the bar. Short downward ducts 158 lead from the air duct 152 to chambers 160 in which air and lubricant mix and discharge downwardly, and which provide the apertures 33. Upweardly inclined bores 162, which intercept the lubricant duct 156 lead through constricted sections 164 into the chambers 160. Plugs are denoted by numeral 170.

All of the spray heads described above have a passage section for lubricant (70,84 and 85, 109 and 109', 134 and 136, or 162 and 164 as the case may be) which rises in the direction of flow, just before the lubricant mixes with air. Because these sections rise, air does not enter the lubricant supply duct system, as it might if these sections ran horizontally or descended in the direction of flow. This prevents lubricant from dripping out during periods when it is not being delivered deliberately to spray out.

It may possibly be arranged that the discharge of air commences slightly before discharge of lubricant, so that when lubricant starts to flow it emerges into an established air stream. Preferably the discharge of air is continued slightly after lubricant flow stops, to blow out any lubricant droplets from the walls of the downwardly opening chambers such as 66 (FIG. 4) from which spray emerges. These droplets might otherwise drip out later.

Control and Supply Unit

This unit can, as mentioned, stand alongside the forming machine or at a little distance from it. It consists of a cabinet containing a storage tank 210 for lubricant and associated equipment to effect delivery of air and lubricant into the pipes leading to the spray heads, together with electrical/electronic circuitry to control this equipment. Electrical operating controls are mounted on the front face of the cabinet.

Pneumatic Equipment

Figure 15:
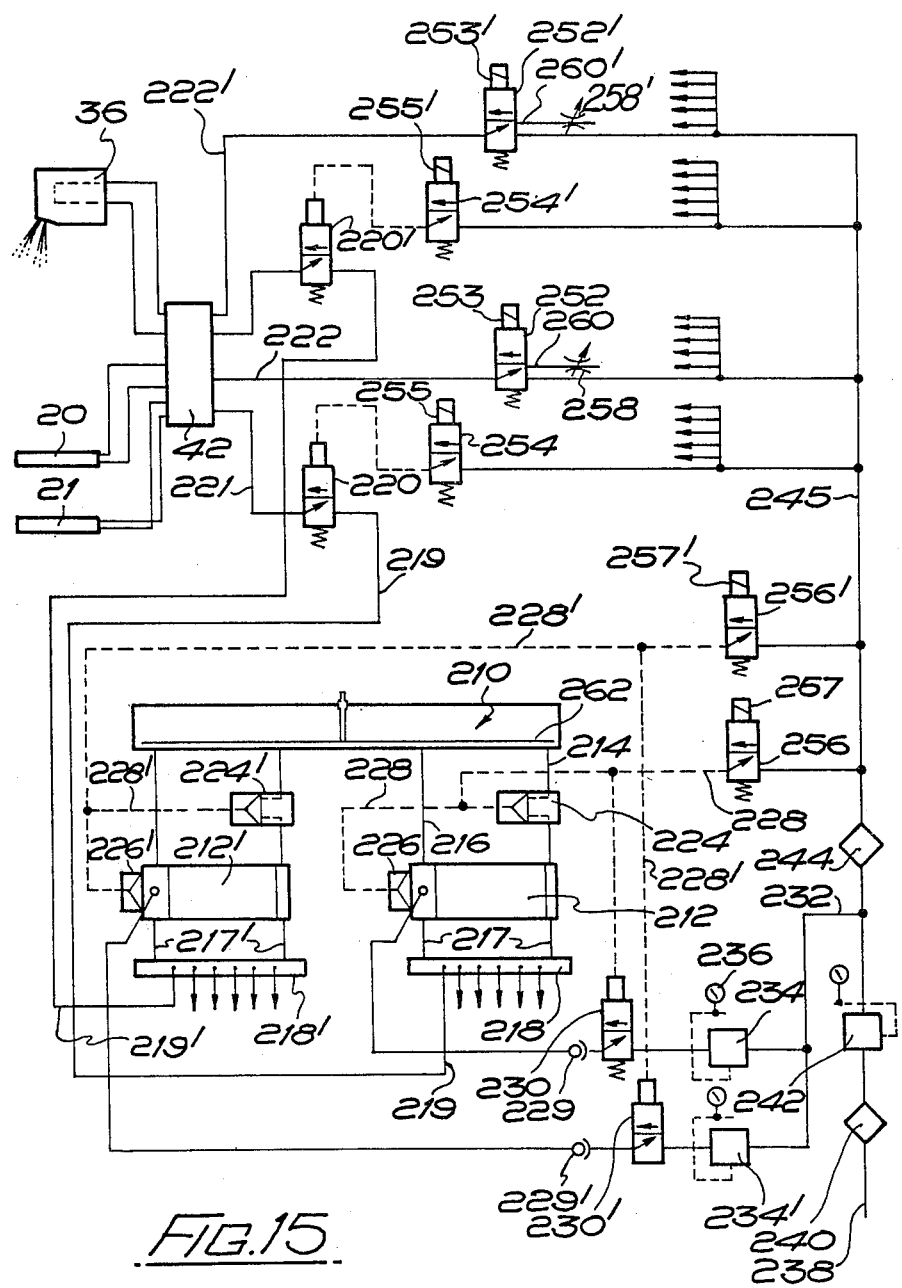
FIG. 15 is a diagrammatic illustration of the apparatus showing the pneumatic and lubricant flow paths.

FIG. 15 shows the pneumatic equipment used to deliver air and lubricant. The equipment has a main tank 210 to contain a supply of the lubricant consisting of a colloidal dispersion of graphite in a liquid which is predominantly oil. The apparatus also has two charge chambers 212,212' each of which consists of a second container for lubricant, which is small in relation to the lubricant tank 210 and which is able to be placed under pressure. The charge chamber 212 is employed for lubricating the mould halves 14 while the charge chamber 212' is employed for lubricating neck rings 18.

The parts of the equipment employed for lubricating mould halves 14 will be described, but it should be understood that exactly corresponding parts are provided for lubricating neck rings and these are indicated on the drawing by primed references, but will not be mentioned separately.

The lubricant tank 210 communicates with the charge chamber 212 by way of a feed conduit 214 and a return conduit 216. Outlets 217 from the charge chamber are connected at a manifold 218 to a plurality of conduits 219, only one of which is shown in full. Each conduit 219 leads to a respective valve 220 by which lubricant from the conduit is admitted into a pipe 221 leading to a section of the IS machine. There are as many conduits 219, valves 220 and pipes 221 as there are sections on the machine. (FIG. 15 shows six of each, for a six section IS machine). The conduit 214 contains a valve 224 to close it. A valve 226 governs the connection between the return conduit 216 and the charge cylinder 212. Both of these valves are normally open, and in this state lubricant from the container flows by gravity into the charge cylinder 212, which is positioned below the tank 210.

The two valves 224,226 close simultaneously when acted upon by a pilot signal in the form of air pressure in a system of lines 228 (shown dotted). The pilot signal also acts simultaneously on a normally spring closed valve 230 so that it opens and allows air under pressure from an air supply line 232 to pass, by way of a check valve 229, into the charge chamber 212 to pressurise the lubricant therein. The pressure thus produced in the charge chamber 212 can be adjusted as required by a pressure regulator 234 in the line 232. A pressure gauge 236 is provided to indicate the pressure produced in the charge chamber 212 when the valves 224 and 226 have been closed and the valve 230 opened.

The main air inlet 238 is connected via a filter 240, regulator 242 and lubricator 244 to a main air line 245. This is connected to an electric solenoid operated valve 252 for each section, which valve governs the admission of pressurised air to a pipe 222 leading to that section. The main air line 246 is also connected to a further solenoid operated valve 254 for each section. Each of these governs the supply of air to operate the valve 220 associated with that section of the IS machine. Only one each of the valves 252,254 is shown. The main air line 245 is also connected to a further electric solenoid operated valve 256 which when opened produces the pilot signal in the lines 228 and thereby causes the valve 230 to open and the valves 224 and 226 to close.

Electric circuits for controlling the pneumatic equipment by operating the solenoids 253,255,257 of the valves 252,254,256 will be described hereafter. The arrangements are all such that whenever spraying is to take place the valve 256 is opened so as to open the valve 230 and pressurise the charge chamber 212 and lubricant in all the lines 219. After spraying has been carried out, the solenoid 257 of valve 256 is de-energised so that the pressure in the airlines 228 is released, so allowing the valve 230 to close and valves 224 and 226 to reopen. When these reopen the residual pressure in the charge chamber 212 is able to escape into the lubricant tank 210, after which the lubricant can once more flow from the tank 210 under gravity to refill the charge chamber 212. The escape of residual pressure into the tank 210 helps to agitate the lubricant in that tank and also keeps the valves 224 and 226 free of solid particles settling out of the lubricant.

The amount of lubricant delivered at a section of the machine is determined by the length of time for which the valve 254 is held open and this is determined by an interval timer, as will be explained hereafter. The valves 252 and 254 need not of course be operated simultaneously but in fact in the arrangements hereafter they are opened and closed simultaneously. When the valves 252,254 close, the flow of lubricant is stopped at once. However, the residual air pressure downstream of the valve 252 (i.e. in the pipe 222 leading to the relevant section of the IS machine and in the hoses 40 at that section), exhausts through the spray heads during a further short period of time. As has already been mentioned, this is advantageous for blowing out traces of lubricant which might otherwise subsequently drip. The amount of air which is discharged after the valve 252 closes can be varied by means of an adjustable flow regulator 258 connected to the port 260 of the valve 252. The setting of this regulator determines the proportions in which residual air in the line 222 blows out through the spray heads, and through the regulator.

Within the lubricant tank 210 there is a perforated plate 262 overlying the base of the tank. This is continuously recirprocated up and down through a small stroke to agitate the lubricant in the tank. The reciprocation is accomplished by a double acting pneumatic piston and cylinder (not shown) fitted with valves by which its travel is reversed at the end of each stroke while its speed of travel is governed by means of restricting exhaust from it. Air to operate it is taken from the line 245.

Electric Control Circuit

Figure 16A:
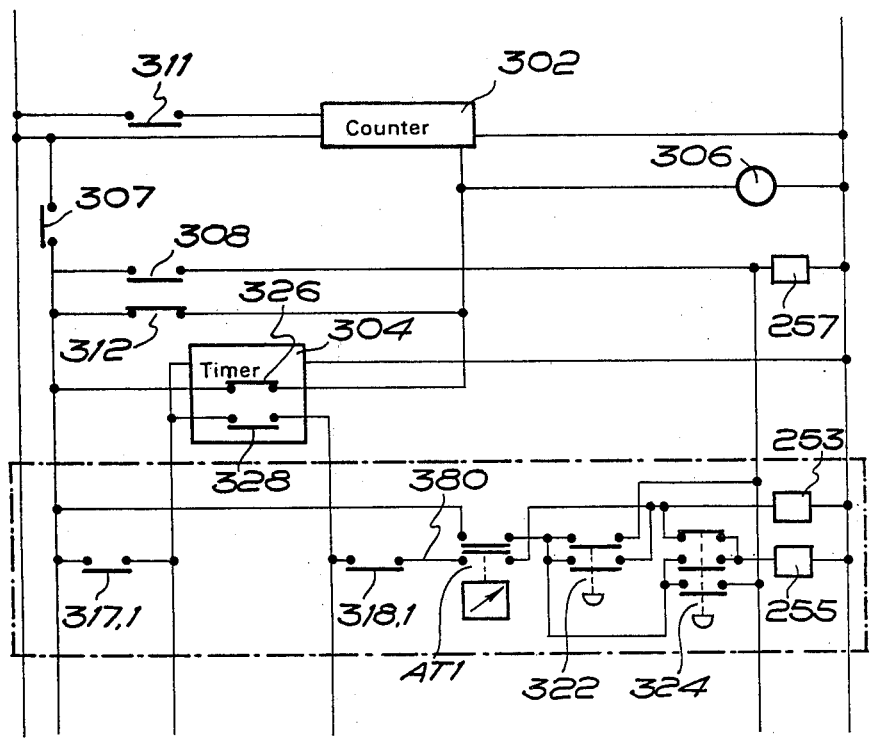
FIGS. 16a and 16b show a possible electric circuit for the apparatus.
Figure 16B:
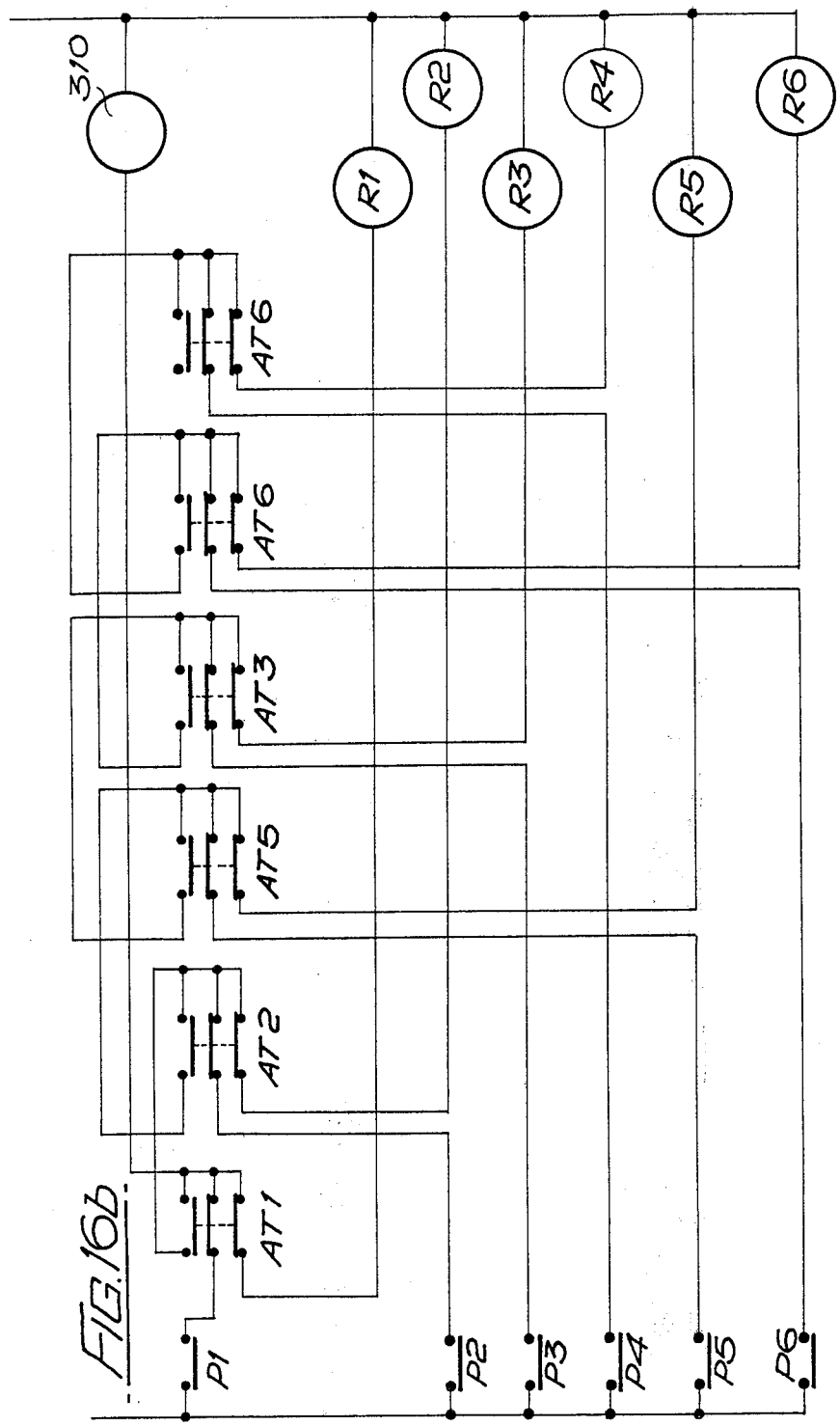

FIGS. 16a and 16b show one possible electric circuit for controlling the supply of current to the solenoids of the valves, and so controlling the spraying. This circuit controls the valves 252,254,256 for spraying the blank mould halves 14; a duplicate circuit would be used for controlling the valves 252',254',256' for the neck rings.

The circuit includes a dividing counter 302 (variously termed a predetermining counter); the solenoid 257 of the pilot relay valve 256; an interval timer 304; a relay 306 containing normally open contacts 307,308; and a relay 310 containing normally open contacts 311, and normally closed contacts 312. The circuit also includes for each section a pressure switch P which closes when the mould halves are open and accessible for spraying; a relay R having normally open contacts 317, 318; the solenoids 253,255 of the valves 252,254 associated with that section; a two position switch AT having a number of ganged contacts; a push button 322 to effect manual spraying; and a push button 324 to effect delivery of lubricant, without air, for priming. One position of each switch AT is designated "auto" and effects automatic spraying, the other is designated "test" and enables the buttons 322,324. In FIG. 16a the items associated with section 1 only of a six section IS machine are shown within a phantom outline. It should be understood that these items are duplicated for each further section of the machine.

The pressure switches P are operated by compressed air used in normal operation of the IS machine. Alternatively an electrical signal can be obtained by closure of mechanical contacts on the IS machine, or obtained from the electronic control circuitry used in IS machines of recent construction.

Both FIGS. 16a and 16b show the contacts of switches AT in the "auto" position. As shown by FIG. 16b, when the switches AT are set to "auto" each pressure switch P energises its associated relay R while closed. The sections operate in the sequence 463521, and the pressure switch P1 of the last section also energises relay 310.

It can be seen that if any switch AT is set to "test", the associated relay R cannot be energised. Moreover, the connections between the switches ensure that the last section on "auto" in the 463521 sequence energises the relay 310. For example if switches AT1 and AT2 are at "test", the closing of pressure switch P5 energises its relay R5 and also relay 310, while pressure switches P1 and P2 have no effect. Thus the relay 310 is energised for a period during every machine cycle (unless all switches AT are on "test") and the reopening of its contacts 311 is a signal counted by the counter 302. The general manner of automatic operation is that operating cycles of the machine are counted by the counter 302 until a predetermined number is reached. When the predetermined count is reached, the blank mould halves 14 of each section are sprayed with a metered quantity of lubricant. Spraying at all sections takes place within a single machine cycle, each section being sprayed when its mould halves 14 are in the open position beneath the spray bars 20,21 as signalled by closure of the relevant pressure switch P.

This is accomplished in the following way. When the predetermined count is reached the counter 302 energises relay 306 and current through its contacts 308 energises the solenoid 257 of the pilot valve 256, so pressurising the charge chamber 212. The relay 306 is maintained energised by current through contacts 312 during the machine cycle in which spraying is effected, until the next energising of relay 310 opens contacts 312.

With the relay 306 energised and pressurising the charge chamber 212, spraying takes place at each section on "auto" when its pressure switch P next closes and energises its relay R. Current passes through contacts 307 of relay 306 and contacts 317 and 318 of the relevant relay R to energise the solenoids 253 and 255 for the duration of the interval for which the timer 304 holds contacts 308 closed. (The contacts 308 are normally closed, but open for a short time at the end of the timed interval).

The quantity of lubricant discharged onto the mould halves 14 of a section is determined by the interval to which the timer 304 is set, and is a precise, repeatable quantity.

It will thus be appreciated that the apparatus serves to deliver the same quantity of lubricant to each mould half of the machine, every time the machine performs the number of cycles to which the counter 302 is set. The counter 302 can be set to any number from 0 to 999 and the timer varied between 0 to 1 second in steps of 10 milliseconds. As an example of typical values, the counter 302 might for instance be set to carry out spraying every 40 machine cycles and the timer set for a spray interval of 200 milliseconds.

In order that equal amounts of lubricant are discharged at each section, the lubricant pipes 221 extending from each valve 220 to a distribution block 42 are all made equal in length.

In an entirely analogous manner, spraying of metered quantites of lubricant from the spray heads 36 onto the neck rings is accomplished at regular intervals by means of the duplicate circuit governing operation of the solenoids 253',255', and 257'. The timer of this circuit would be set to an appropriate value and the counter for this circuit is set to count a predetermined number of machine cycles which will quite possibly be different from the number counted by the counter 302 for spraying the mould halves.

It has been found that spraying uniform amounts of lubricant at uniform intervals leads to an excellent surface on the mould halves which is superior to the quality of surface usually obtained with hand swabbing. Moreover, it has been found that the first glassware moulded after applying lubricant is of acceptable quality so that there is no loss of ware, and the life of the blank moulds on the machine is very considerably prolonged. Consequently, this invention not only avoids the inherent risk to an operator attendant upon hand swabbing, but also gives improved productivity of the glass forming machine.

It can be seen from FIG. 16a that when the switch AT of any section is at "test", it disconnects the contact 318 from the solenoids 253, 255 of that section and so suspends automatic swabbing at that section without affecting the others. Also, it makes current available at the push buttons 322 and 324. If either of these is pressed it energises the relay 257 of the valve 256 to place the charge chamber 212 under pressure. Button 322 energises both solenoids 253 and 255 of the section concerned, so as to deliver air and lubricant at that section for as long as the button remains pressed. This is employed for applying extra lubricant to a section, for example immediately after changing the blank moulds. Button 324 energises solenoid 253 to deliver lubricant for as long as the button is pressed, but disconnects it from solenoid 255. It is used when priming the lubricant delivery lines.

Figure 18:
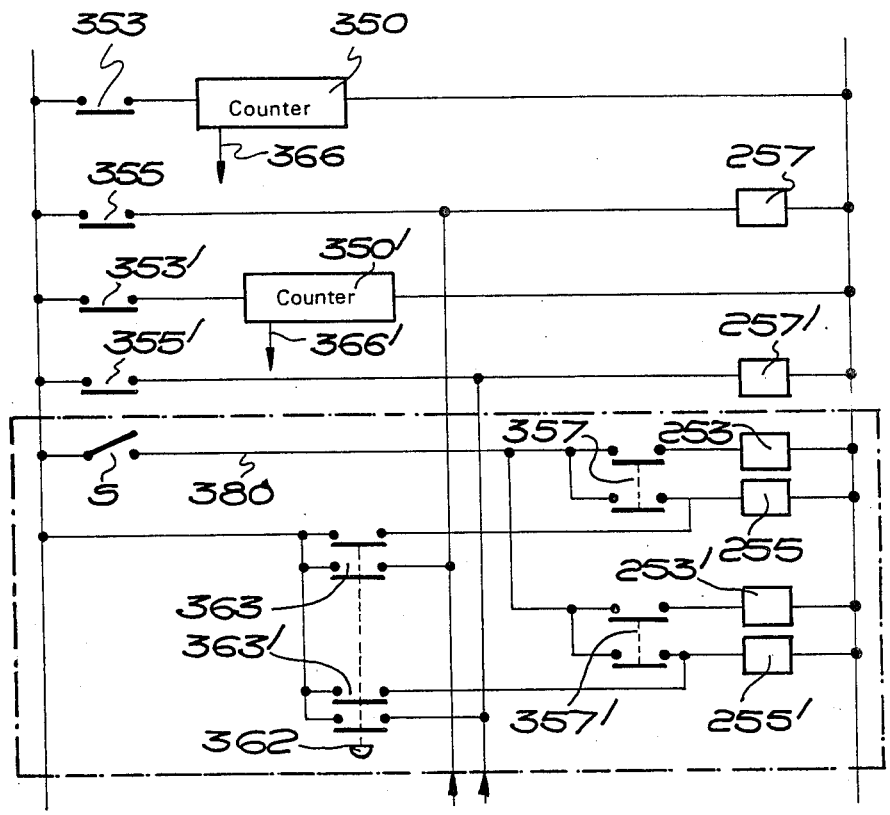

FIGS. 17 and 18 show an alternative circuit which uses electronic components and monitors operations of the IS machine in a different way. The same general result is achieved, however, of counting a predetermined number of machine cycles and then spraying metered quantities whose amounts are determined by the setting of an interval timer, with the count and amounts dispensed for the neck rings being independent of those for the mould halves.

Referring to FIG. 17, and IS machine typically has its functions controlled by a timing drum, carrying tappets, which rotates once in every machine cycle. At the end of this drum there is a 100 tooth gear wheel 330 by which the drum is driven. For operating the spraying equipment, electronic pulses are obtained by means of two solid state detectors 332,324 positioned close to this gear wheel 330 by means of a bracket (not shown) attached to the machine frame. One detector 332 is mounted adjacent the teeth of the gear so as to give 100 pulses per machine cycle. These are used as clock pulses. The second detector is positioned to detect a grease nipple 336 and so give a datum pulse once per machine cycle. More recent IS machines have electronic control instead of a timing drum: in the case of these machines, clock and datum signals can be obtained directly from the electronics of the IS machine.

The clock and datum pulses are fed to shift registers 340,342,344, as shown by FIG. 17. Each as a plurality of outputs and a signal is provided at each of these in succession as clock pulses are received. The shift register 340 has thirty two outputs, and is supplied with the datum pulses from detector 334 which cause it to reset. The signal from one output, near the middle of the thirty two, is employed as a derived datum signal. By changing the output used, the derived datum signal (and with it all spraying operations) can be advanced or retarded in relation to the machine cycle.

The registers 342 and 344 each have 100 outputs, and are reset by means of the derived datum signal. The signals from appropriate outputs of register 342 are used to initiate spraying of the blank moulds. For a six section IS machine, the outputs used could for example be numbers 1, 17, 33, 50, 64, and 87.

The signals from chosen outputs of register 344 are used to initiate spraying of the neck rings 18. The neck rings are in position for spraying for a shorter time than are the blank mould halves. The moment chosen is accordingly more critical, and provision is made for altering any chosen output from shift register 344 so as slightly to advance or retard the spraying of the neck rings of the section concerned, without affecting other sections.

The rest of the circuit is shown schematically by FIGS. 17 and 18. The circuit has a dividing counter 350 to cause spraying of blank mould halves after a predetermined number of machine cycles; a relay 352 with two normally open contacts 353 and 353'; a relay 354 with normally open contacts 355 and the solenoid 257 of pilot valve 256. These parts, except for relay 352, are duplicated for spraying the neck rings and the analogous parts have primed references.

For each section there are as shown within the phantom outlines the solenoids 253,255 of valves 252, 254, a relay 356 having contacts 257 an interval timer 358, and logic elements 360.

These items are all duplicated for spraying neck rings. In addition the parts include a switch S and push buttons 362 and 364 for each section. The buttons 362 have contacts 363 for the blanks and 363' for the neck rings. The button 364 for each section is connected to both logic elements 360,360' for the section. The counter 350 has an output 366 connected to the logic elements 360 of all the sections.

The derived datum signal from the chosen output of shift register 340 energises the relay 352, closing its contacts 353 and 353', and thereby providing a signal corresponding to a machine cycle to each of the counters 350, 350'. Each of the logic elements is an assembly of logic gates, and has inputs for signals from (i) a shift register, (ii) a counter, and (iii) the associated push button 364. Its function is that if it has received a signal from either the button 364 or counter 350, then the next signal from a shift register will provide a signal at both of its outputs.

When the counter 350 reaches the predetermined number of machine cycles it provides a signal to each associated logic element 360. Thereupon, when the logic element for a section next receives a signal from the shift register, a signal from one of its outputs energises relay 354 so as to supply current through its contact 355 to energise the solenoid 257 of the pilot valve 256. The signal from the other output of the logic element operates the interval timer 358 for that section to energise the associated relay 356 for the interval determined by the timer 358. The counter 350' causes the same manner of operation for spraying the neck rings but it can of course be arranged to count a different number of machine cycles before giving an output signal to the logic elements 360'. If at any time the button 364 for a section is pressed then, when the logic elements 360 and 360' for that section next receive signals from the shift registers, they will give outputs and so cause spraying of both the blank moulds and the neck rings of that section when these come into position for spraying.

In its off position the switch S prevents the supply of current to the contacts 357 and 357' and so prevents automatic spraying at that section. Pressing the button 362 for a section will supply current to energise the solenoids 252,252', 257 and 257', bypassing the relay contacts 355 and 357 and so delivers lubricant, but not air, for as long as the button remains pressed. Once again, this is used for the purpose of priming the lubricant supply lines for the section concerned.

The circuit described with references to FIGS. 16–19 differs in function from that described with reference to FIG. 15 principally in that the duration of spraying at any section can be set independently of the durations set at other sections. Secondly the moment of spraying the neck rings can be adjusted individually. Thirdly the push button for causing spraying at a section gives the normal metered quantity as soon as the blank moulds and neck rings of that section are next in position for spraying, rather than spraying for as long as the push button is depressed.

Each section of an IS machine has a switch to divert gobs to waste in order to be able to stop that section. If desired the electrical connections marked 380 in FIGS. 16a and 18 may pass through contacts opened by this switch so that diverting the gob stops automatic spraying of the relevant section.

I claim:

1. A method of intermittently spraying lubricant onto at least one mould of a hollow glassware moulding machine, which mould has a pair of openable halves defining one or more cavities with upright axes extending between first and second ends of the cavities, comprising arranging spray discharge points beyond one of said ends and fixed relative to the open positions of the mould halves, the lubricant being a liquid and being sprayed as droplets entrained in a steam of air or other gas, separately delivering the lubricant and gas to and mixing the lubricant and gas in spray heads which define the discharge points, periodically discharging a quantity of the lubricant generally along the respective axis from said points onto the mould halves while the mould halves are in their open position, continuing the discharge of air after the discharge of liquid lubricant.

2. A method of intermittently spraying lubricant onto at least one neck ring of a hollow glassware moulding machine having a pair of mould halves closable together above said neck ring, comprising arranging one or more points for the discharge of a lubricant spray above the level of said pair of mould halves and periodically discharging a spray of lubricant from said points in synchronism with the machine operation so as to take place while the mould halves are open, and directing said spary past the mould halves through the space between the mould halves onto the neck ring associated with the mould halves.

3. A method of spraying lubricant intermittently onto mould parts of a hollow glassware moulding machine, comprising separately supplying air and lubricant to at least one chamber or duct, discharging mixed air and lubricant downwardly from the chamber or duct onto the mould parts, delivering the lubricant along a respective run proximate to and upstream of the at least one chamber or duct, said run rising in the direction of flow, and intermittently applying pressure to discharge air and lubricant from the chamber or duct.

4. In combination, a hollow glassware moulding machine having at least one mould with mould halves movable between closed and open positions, an apparatus for intermittently spraying lubricant onto the halves of said mould, the apparatus comprising spray heads, each spray head having at least one spray discharge opening and being associated with a respective mould cavity defined by a mould half, the spray heads being arranged so that when the mould is open the at least one discharge opening is above the open position of the respective mould half and directed downwardly towards the cavity defined thereby, the apparatus also having sensing means for determining when the mould is open, means for delivering a quantity of lubricant under pressure to the at least one opening of each spray head to spray therefrom while the mould is open, each spray head having separate inlets for lubricant and for air or another gas under pressure, separate passages leading from the inlets to at least one chamber or duct which opens downwardly at said spray discharge openings, the gas and lubricant mixing in said chamber or duct, a lubricant passage portion being provided upstream of, and proximate to, the at least one chamber or duct, said passage portion rising in the direction of flow.

5. A hollow glassware moulding machine having at least one pair of mould halves movable between closed and open positions and a neck ring associated with the or each cavity defined by the mould halves, said mould halves being closable together above said neck ring, the machine being provided with an apparatus for spraying the neck rings comprising at least one spray head associated with said pair of mould halves and arranged above the level of the mould halves, the spray head defining at least one spray discharge opening and arranged so that when the mould is open discharge from the head passes between the open mould halves onto the associated neck ring, means for sensing when the ring is located beneath the mould halves with the mould halves open, and means for delivering a metered quantity of lubricant under pressure to the spray head to spray therefrom onto the neck ring.

6. A spray head for the intermittent application of lubricant spray to mould parts of a hollow glassware moulding machine, comprising inlet means for the admission of air and lubricant, at least one downwardly opening chamber or duct for the discharge of a mixture of air and lubricant therefrom, passage means leading from the inlet means to the at least one chamber or duct, and a respective passage section for conveying lubricant which passage section is upstream of and proximate to the at least one chamber and rises in the direction of flow.

7. A spray head according to claim 6, further comprising separate inlets for air and lubricant and separate passages for air and lubricant leading from the inlets to the at least one chamber or duct.

8. A spray head according to claim 7, wherein each rising passage section contains a constriction.

9. A spray head according to claim 6, wherein the spray head comprises two halves connectable together so that their mating faces make sealing contact, and separate channels for air and lubricant being provided by grooves milled in at least one of the mating faces.

* * * * *